United States Patent
Saini et al.

(10) Patent No.: US 7,998,906 B2
(45) Date of Patent: Aug. 16, 2011

(54) METHODS AND COMPOSITIONS FOR TREATING SUBTERRANEAN FORMATIONS

(75) Inventors: Rajesh K. Saini, Duncan, OK (US); Michael W. Sanders, Duncan, OK (US); Fong-Fong Foo, Cypress, TX (US); Jeff L. Mundy, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 304 days.

(21) Appl. No.: 12/229,229

(22) Filed: Aug. 21, 2008

(65) Prior Publication Data

US 2010/0048431 A1     Feb. 25, 2010

(51) Int. Cl.
*C09K 8/60* (2006.01)
*C09K 8/68* (2006.01)
*C09K 8/74* (2006.01)
*C23F 11/18* (2006.01)

(52) U.S. Cl. ........ 507/219; 507/203; 507/267; 507/269; 507/270; 507/271

(58) Field of Classification Search .................. 507/203, 507/219, 267, 269, 270, 271
See application file for complete search history.

(56) References Cited

U.S. PATENT DOCUMENTS

| 4,928,763 A * | 5/1990 | Falk ............................... 166/285 |
| 5,238,065 A * | 8/1993 | Mondshine et al. .......... 166/300 |
| 7,159,658 B2 | 1/2007 | Frost et al. .................... 166/300 |
| 7,337,839 B2 | 3/2008 | Ayoub et al. ............... 166/250.1 |

* cited by examiner

*Primary Examiner* — Timothy J. Kugel
*Assistant Examiner* — Atnaf Admasu
(74) *Attorney, Agent, or Firm* — Robert A. Kent; McDermott Will & Emery LLP

(57) ABSTRACT

Methods and compositions useful in treating subterranean formations, and more particularly, breaker compositions that may be useful in treating subterranean formations wherein synthetic polymers are used, are provided. Of the many methods and compositions provided herein, one composition comprises a source of hydrogen peroxide and an activator. One method comprises providing a polymer breaker composition comprising a source of hydrogen peroxide and an activator; introducing the polymer breaker composition into a well bore which penetrates a subterranean formation; allowing the activator to activate the source of hydrogen peroxide to create an oxidizing species; and allowing the oxidizing species to break synthetic polymers present in the subterranean formation.

20 Claims, 2 Drawing Sheets

BREAK DATA – FR-26LC™ + WATER AT 95°F
ADJUSTED BASE GEL pH TO 7.0 (6/29/06)

| TIME (hrs) | DIAL RDG | VIS (cp) | pH |
|---|---|---|---|
| 0 | 196 | 39.2 | 7 |
| 0.42 | 188 | 37.6 | 7 |
| 2 | 186.5 | 37.3 | 7.1 |
| 25.5 | 181 | 36.2 | 7.1 |

FIG.2

METHODS AND COMPOSITIONS FOR TREATING SUBTERRANEAN FORMATIONS

BACKGROUND

The present invention relates to methods and compositions for treating subterranean formations, and more specifically, to improved breaker compositions for synthetic polymers, and methods for reducing the viscosity of viscosified treatment fluids.

Synthetic polymers, which include polymers that do not occur naturally but may be formed artificially from petrochemicals, may be used in a variety of subterranean treatment fluids that may be used in a variety of operations and treatments conducted in oil and gas wells. As used herein, the term "treatment fluid" refers to any fluid that may be used in a subterranean application in conjunction with a desired function and/or for a desired purpose. The term "treatment fluid" does not imply any particular action by the fluid or any component thereof. Such operations and treatments include, but are not limited to, stimulation, completion, fluid loss control operations, and other similar applications.

In fracturing operations, synthetic polymers are often added to treatment fluids to form viscosified treatment fluids. After the operation, to recover (and possibly recycle) the fluid, oftentimes the viscosifying synthetic polymer is broken (e.g., by breaking its backbone and/or polymer chains) so that the viscosity of the fluid is reduced, thereby allowing the fluid to flow back to the surface and be recovered. This process may be referred to in the art as "breaking the fluid." Compositions that are used in this process to interact with the polymer so as to reduce the viscosity of the fluid may be referred to in the art as "breakers."

Generally, the synthetic polymers used in subterranean application may be of high molecular weight and contain hydrocarbon backbones, which may be hard to break in a controlled manner. An example is a copolymer of acrylamide and acrylic acid that has a high molecular weight and can be used as a friction reducer. It contains a hydrocarbon backbone that may be hard to break. Often these polymers adsorb onto the formation or become incorporated within a filter cake. Because such polymers may be difficult to break, their incomplete removal from the filter cake ultimately may affect the permeability of the formation.

Furthermore, breaking viscosified fluids at lower temperatures, e.g., 60° F. to 150° F., may be challenging. Typically greater amounts of oxidizers may be needed to break these polymers at low temperatures. Attempts to obtain delayed controlled break times by reducing the concentration of breakers generally may result in incomplete breaks of the polymer and may be damaging to the permeability of the producing zone. The traditional hypochlorite breakers used to break these polymers at low temperature also may suffer from other disadvantages such as corrosion of pipes, generation of residue, generation of chlorine gas (when mixed with certain brines), uncontrolled break, etc. For high temperature (>150° F.) wells, sodium perborate may break the polymers, but at low temperature the breakage may be slow and may not reach completion before all the hydrogen peroxide generated is consumed.

Similarly, synthetic polymers may be used in other applications described previously where they need to be broken before they can be removed from the formation. Furthermore, in tools applications, there may be a need for some elastomeric parts, e.g., rubber parts, to degrade after a delay period at low temperatures. Currently there is no chemical method available with service companies to break the rubber components.

SUMMARY

The present invention relates to methods and compositions for treating subterranean formations, and more specifically, to improved breaker compositions for synthetic polymers, and methods for reducing the viscosity of viscosified treatment fluids.

A method comprising providing a polymer breaker composition that comprises a source of hydrogen peroxide and an activator, wherein the activator comprises at least one activator selected from the group consisting of: an acyl donor and a transition metal catalyst; and introducing the polymer breaker composition into a well bore penetrating a subterranean formation so that the polymer breaker composition interacts with a synthetic polymer to break the synthetic polymer.

A method comprising providing a treatment fluid comprising an aqueous-based fluid and a synthetic polymer breaker composition, wherein the polymer breaker composition comprises a source of hydrogen peroxide and an activator, wherein the activator comprises at least one activator selected from the group consisting of: an acyl donor and a transition metal; and introducing the treatment fluid into a well bore penetrating a subterranean formation so that the polymer breaker composition interacts with a synthetic polymer to break the synthetic polymer.

A polymer breaker composition comprising a source of hydrogen peroxide wherein the source of hydrogen peroxide comprises at least one source of hydrogen peroxide selected from the group consisting of: an inorganic persalt; an alkali metal peroxide; an organic peroxide; hydrogen peroxide; and any combination thereof; and an activator comprising an acyl donor wherein the acyl donor comprises at least one acyl donor selected from the group consisting of: ethyl acetoacetate, ethylacetate, tetracetylethylenediamine, sodium nonanoyloxybenzenesulfonate, and any combination thereof.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 2 illustrates data from polymer breaking tests performed on a variety of treatment fluids.

DESCRIPTION OF PREFERRED EMBODIMENTS

Figure 1:
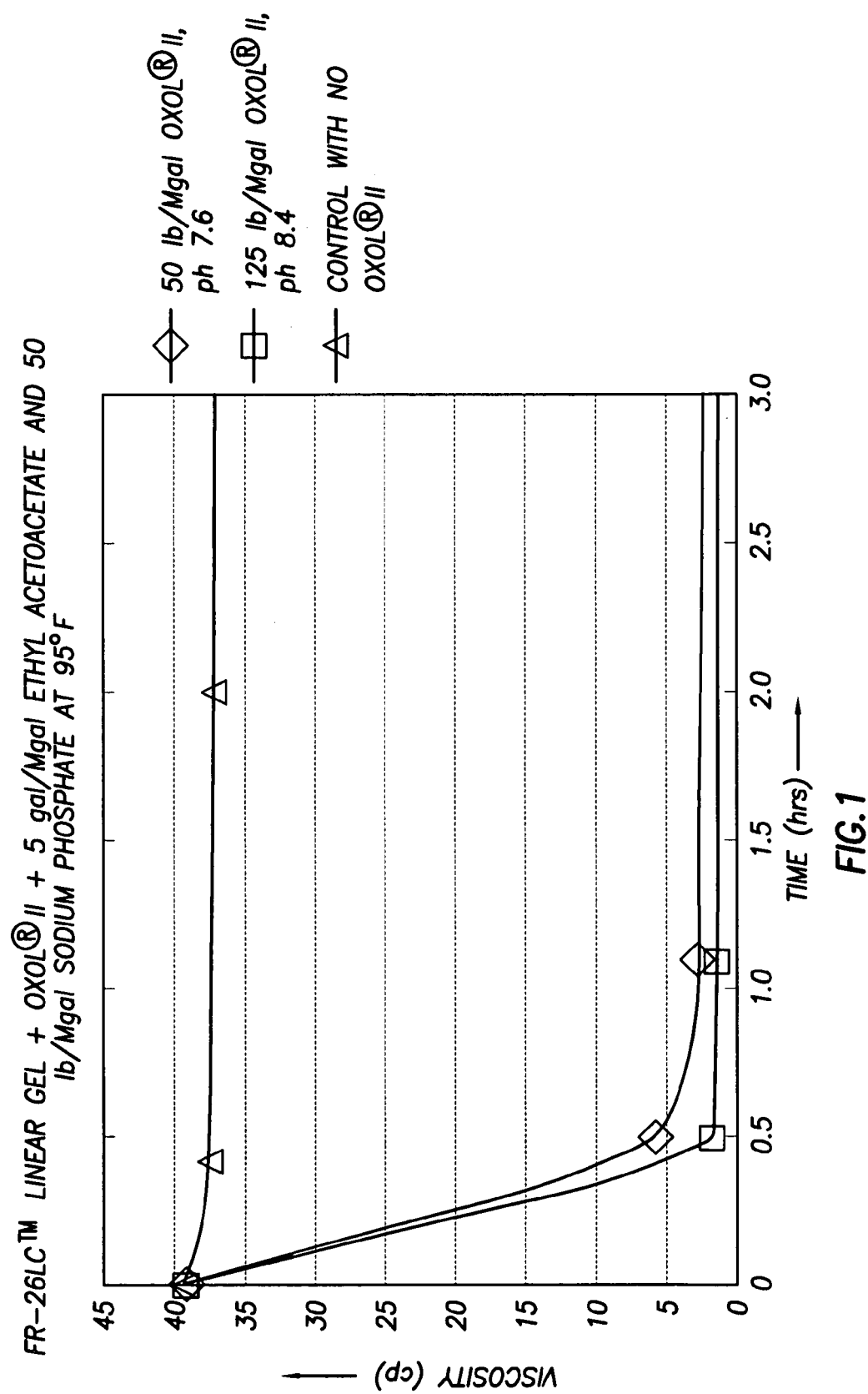
FIG. 1 illustrates data from polymer breaking tests performed on a variety of treatment fluids.

The present invention relates to methods and compositions for treating subterranean formations, and more specifically, to improved breaker compositions for synthetic polymers, and methods for reducing the viscosity of viscosified treatment fluids.

There may be several potential advantages to the methods and compositions of the present invention, only some of which may be alluded to herein. One of the many potential advantages of the methods and compositions of the present invention is that they may allow, inter alia, for the reduction of the viscosity of a viscosified treatment fluid at a temperature range of about 60° F. to about 200° F. with reduced corrosion, more controlled break, less residue, and/or chlorine generation. The methods and compositions of the present invention may be useful in interacting with synthetic polymers in such a way to reduce the viscosity of water based treatment fluids comprising the synthetic polymers, such as fracturing fluids, fluid loss control gels, fluid loss control materials, and gravel pack fluids and may also be useful in filter cake cleanup. Another potential advantage of the methods and compositions of the present invention is that they may also be useful in degrading elastomeric parts in certain downhole equipments after a required delay time and, in certain circumstances, may be incorporated in the rubber for delayed degradation.

An example of a polymer breaker compositions of the present invention comprises a hydrogen peroxide source and an activator. In general, the hydrogen peroxide source may be any type of hydrogen peroxide source capable of giving free hydrogen peroxide at low temperatures in aqueous solutions. Examples of suitable hydrogen peroxide sources can include, but are not limited to, sodium perborate, sodium percarbonate, diluted hydrogen peroxide, magnesium peroxide, calcium peroxide, and any combination thereof. In some embodiments the hydrogen peroxide source can include, but is not limited to, inorganic persalts, alkali metal peroxides (e.g., sodium peroxide), organic peroxide (e.g., urea-hydrogen peroxide), and hydrogen peroxide, and any combination thereof. Persalts include, for example and without limitation, alkali perborates, percarbonates, perphosphates, with more specific examples including, without limitation, sodium perborate monohydrate, sodium perborate tetrahydrate, sodium percarbonate, and sodium pyrophosphate peroxyhydrate.

The hydrogen peroxide source may be present in embodiments of the polymer breaker compositions in a sufficient concentration to substantially reduce the viscosity of a treatment fluid, in accordance with embodiments of the present invention. For example, the hydrogen peroxide source may be present in at least about 0.6% by weight (50 lb/Mgal) of the viscous treatment fluid, and alternatively in the range of about 0.6% by weight (50 lb/Mgal) to about 3% by weight (250 lb/Mgal) of the viscous treatment fluid, although much greater concentrations can be used.

As set forth above, embodiments of the polymer breaker compositions of the present invention further comprise an activator. In general, activators may increase the reactivity of available oxygen from the source of hydrogen peroxide for oxidation. Examples of suitable activators include, but are not limited to acyl donor activators, metal ion catalysts, and any combination thereof.

Suitable acyl donor activators may comprise compounds with acyl groups which generally may be attached to an aliphatic alcohol, phenol, or secondary/tertiary nitrogen source. Examples of suitable acyl donors can include ethyl acetoacetate, tetracetylethylenediamine, and sodium nonanoyloxybenzenesulfonate. In certain embodiments, the acyl donor may be present in at least about 1.5 gal/Mgal of the viscous treatment fluid, and alternatively in the range of about 5 gal/Mgal to about 10 gal/Mgal of the viscous treatment fluid, although much greater concentrations can be used. For example, the acyl donors may be present in at least about 0.1% by weight of the viscous treatment fluid, alternatively, in the range of about 0.1% to about 1% by weight of the viscous treatment fluid, although much greater concentrations can be used.

As will be appreciated by those of ordinary skill in the art with the benefit of this disclosure, it is believed that the acyl donor activator may activate the source of hydrogen peroxide to generate an oxidizing species, also called a peracid, which is a more powerful oxidizer than hydrogen peroxide. An example of an oxidizing species may be peracetic acid. The acyl group of the acyl donor activator may react in situ with the source of hydrogen peroxide to generate a peracid. By way of illustration, the formation of peracetic acid and perethylacetoacetic acid from sodium perborate and ethyl acetoacetate and tetracetylethylenediamine is shown below.

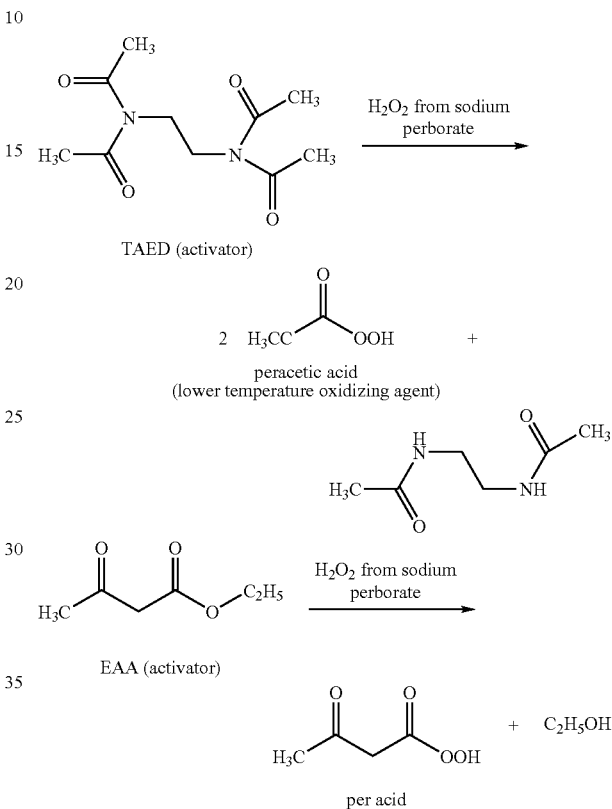

The polymer breaker of the present invention may comprise a transition metal ion catalyst. Suitable transition metal ion catalysts may include any transition metal ion catalyst that enhances the oxidation of the source of hydrogen peroxide. As will be appreciated by those of ordinary skill in the art with the benefit of this disclosure, it is believed that the transition metal catalyst in the treatment fluid may catalyze peroxide reactions to promote the formation of reactive peroxy or oxo derivates at low temperatures. With transition metal catalysts there may be less metal ion usage in the reaction and less cost with greater economy of chemical usage. Suitable transition metal catalysts may comprise complexes formed from transition metals such as manganese, iron, copper, and cobalt. Examples of suitable transition metal catalysts can include manganese, cobalt, and copper catalysts.

The transition metal catalysts may be chelated to attain the delayed breaking of the synthetic polymers. The chelating agents may comprise EDTA, alkali or alkaline metal salts of EDTA, alkali metal citrate, citric acid, iminodiacetic acid, gluconate, NTA, tetraamidomacrocyclic ligand, and any combination thereof in any proportion. In certain embodiments, the chelated transition metal may include copper-EDTA, Fe-citrate, Mn(III)-gluconate, a Fe-Tetraamidomacrocyclic ligand, or any combination thereof in any proportion.

The ratio of the source of hydrogen peroxide to activator may be controlled to control the rate of oxidation. The rate of oxidizing species generation may be enhanced by a higher peroxide-to-activator ratio. One of ordinary skill in the art would adjust the peroxide-to-activator ratio to an appropriate ratio in order to achieve the desired rate of oxidation. In some embodiments, a suitable peroxide-to-activator ratio may be in the range of about 25-1 wt percent of peroxide per that of activator.

Also, in certain embodiments, the temperature and pH of the polymer breaker composition may be controlled to control the rate of oxidation. Higher pH and higher temperature should favor oxidizing species generation. However, at lower temperatures, oxidation and breakage of synthetic polymers by peracid may be more effective at lower pH levels (e.g., about 6.0-8). During oxidation, the pH of the medium may be lowered due to the formation of acid by the decomposition of peracid and also by the oxidation of the polymer to molecules containing carboxylic acid groups. This lowering of pH below about 6.0 generally should slow down the rate of decomposition of hydrogen peroxide at low temperatures and the generation of peracid and ultimately the rate of breakage of polymer. If the pH is too high, the rate of generation of peracid is too quick and the polymer breaker composition may be spent too quickly without completely oxidizing the polymer. It therefore may be desirable to keep the pH in the optimum range for obtaining an effective break, for example, by adding a pH adjusting compound. The pH adjusting compound may comprise, for example, a buffer, an acid, or a base.

As set forth above, oxidizing species or reactive peroxy or oxo derivatives may be generated from the hydrogen peroxide source and activator. In accordance with embodiments of the present invention, the oxidizing species or reactive peroxy or oxo derivatives may be used, for example, to break synthetic polymers present in a subterranean formation. This may be desirable, for example, for the reduction of the viscosity of a viscosified treatment fluid, filter cake cleanup, degradation of elastomeric parts of downhole tools, and the like. By way of example, a polymer breaker composition of the present invention may interact with a synthetic polymer to reduce the viscosity of a viscosified treatment fluid forming a reduced viscosity treatment fluid. The reduced viscosity treatment fluid may then be recovered from the subterranean formation. By way of further example, a polymer breaker composition may interact with a synthetic polymer present, for example, on a formation face or in a filter cake. The broken synthetic polymer then be dissolved in water and recovered from the subterranean formation.

Generally, the breaking of a synthetic polymer requires a certain number of cleavages in the polymer backbone or polymer branches so as to break the polymer. Accordingly, the concentration of polymer breaker composition needed to break the synthetic polymer can be determined based on the type and amount of synthetic polymer to be broken. In certain embodiments, the amount of polymer breaker composition used may be that amount required to reduce the viscosity of a viscous treatment fluid at a static temperature in the range of from about 60° F. to about 150° F. to a preselected lower viscosity or to a complete break. The optimum or effective amount of the polymer breaker composition employed in accordance with the present embodiment may depend on factors such as the particular synthetic polymer and its concentration, the formation temperature, and other factors. In certain embodiments, the polymer breaker composition may be employed in the range of about 0.01 to about 500 pounds per 1000 gallons of viscous treating fluid. For example, the polymer breaker composition may be present in at least about 0.001% by weight of the viscous treating fluid, alternatively, in the range of about 0.001% to about 6% by weight of the viscous treating fluid, although much greater concentrations can be used.

The polymer breaker composition can be introduced into the subterranean formation by any means. In one embodiment the polymer breaker composition may be introduced into the subterranean formation by itself. The polymer breaker composition may be introduced into a subterranean formation by way of a well bore penetrating the formation. Once introduced into the subterranean formation, the polymer breaker composition may, for example, interact with synthetic polymer which already may be present in the subterranean formation.

In another embodiment the polymer breaker composition may be combined with water to form a treatment fluid before it is introduced into the subterranean formation. The treatment fluid may comprise water and a polymer breaker composition of the present invention. The water utilized in the treatment fluid of this embodiment can be fresh water or salt water. The term "salt water" is used herein to mean unsaturated salt solutions and saturated salt solutions including brines and seawater. Generally, salt may be added to the water to provide clay stability and to increase the density of the water based fluid. Examples of salts that can be used include, but are not limited to, sodium chloride, sodium bromide, calcium chloride, potassium chloride, ammonium chloride and mixtures thereof. The salt or salts used can be present in the salt water in a concentration up to about 66% by weight thereof and the salt water can have a density up to about 15.5 pounds per gallon. The treatment fluid may include any other conventional additives, such as proppants, pH control agents, bactericides, clay stabilizers, surfactants and the like, that do not undesirably react with the other components of the treating fluid to inhibit performance of the desired treatment upon a subterranean formation.

In another embodiment, the treatment fluid further may comprise the synthetic polymer. The synthetic polymer may, for example, be a viscosity enhancing polymer, a friction reducing polymer, such as FR-26LC™ and FR-56LC™ obtained from Halliburton Energy Services. This treatment fluid can be introduced into a subterranean formation by way of a well bore penetrating the formation. When a viscous treatment fluid is utilized in accordance with this embodiment, various viscosity increasing, synthetic polymers can be included in the treating fluid composition. As used herein, a treatment fluid is considered "viscous" when it has a viscosity of 1 centipoise, as measured using a Fann Viscometer. Examples of suitable viscosity enhancing synthetic polymers include, but are not limited to, polyacrylamides, conformance chemicals, poly(ethylene oxide), poly(vinylpyrrolidone), poly(acrylic acid), poly(methacrylic acid), poly(AMPS), poly(vinyl alcohol), and other viscosity increasing polymers known in the art. The synthetic polymers may also include copolymers formed by the combination of monomers from which the above described polymers are prepared. For example, FR-26LC™ friction reducer, available from Halliburton Energy Services, Inc., may be prepared by the combination of acrylamide and acrylic acid. Similarly other combinations in any amount can be employed to get the desired characteristic and properties and for different conditions. In certain embodiments, it may be useful to limit the charged polymers in salt conditions since the salt may shield the charged group and the polymer may fold up and thereby decrease viscosity. For example, one skilled in the art, would appreciate utilizing adjustments in pH to maintain an unfolded polymer and may utilize standard techniques to adjust the pH range to stabilize the viscosity.

In some embodiments, the present invention provides methods that comprise: providing a polymer breaker composition that comprises a hydrogen peroxide source and an acyl donor activator, allowing the acyl donor activator to activate the hydrogen peroxide to create an oxidizing species, introducing the polymer breaker composition into a well bore which penetrates a subterranean formation, and allowing the oxidizing species to interact with a synthetic polymer to break the synthetic polymer. In certain embodiments, the synthetic polymer may be present in the formation prior to the introduction of polymer breaker composition. In other embodiments, the synthetic polymer may be introduced simultaneously with polymer breaker composition, for example, in a treatment fluid.

In some embodiments, the present invention provides methods that comprise: providing a polymer breaker composition that comprises a hydrogen peroxide source and a transition metal ion catalyst, allowing the transition metal ion catalyst to enhance oxidative properties of the source of hydrogen peroxide to create an activated source of hydrogen peroxide; and allowing the activated source of hydrogen peroxide to interact with a synthetic polymer to break the synthetic polymer. In certain embodiments, the synthetic polymer may be present in the formation prior to the introduction of polymer breaker composition. In other embodiments, the synthetic polymer may be introduced simultaneously with polymer breaker composition, for example, in a treatment fluid.

To facilitate a better understanding of the present invention, the following examples of certain aspects of some embodiments are given. In no way should the following examples be read to limit, or define, the entire scope of the invention.

EXAMPLES

Example 1

A linear gel (viscosity 40 cP) was prepared by dissolving FR-26LC™ friction reducer in 3% KCl brine. To this gel was added 50-125 lb/Mgal OXOL™ II, a peroxide commercially available from Halliburton Energy Services, Inc., in Duncan, Okla., 5 gal/Mgal of ethyl acetoacetate and 50 lb/Mgal sodium phosphate, and the mixture was kept in water bath at 95° F. The viscosity of the sample was measured periodically. Viscosity readings were taken on a $\frac{1}{5}^{th}$ spring Fann 35 Viscometer. The results of these tests are illustrated in FIG. 1. As can be seen from FIG. 1, the oxidizer broke the polymer at a low temperature. Similarly, other synthetic polymers such as poly(ethylene oxide) and poly(vinylpyrrolidone) were also broken by the oxidizer of the present invention.

Example 2

A linear gel (viscosity 40 cP) was prepared by dissolving FR-26LC™ friction reducer in 3% KCl. brine. To this gel was added 50 lb/Mgal OXOL™ II and adjusted the pH to 6. Then solution of $FeSO_4$ (25 mg in 2 ml) in water was added to the gel. Within 5 minutes the viscosity of the solution decreased. Viscosity readings taken on a $\frac{1}{5}^{th}$ spring Fann 35 Viscometer.

Example 3

A linear gel (viscosity 40 cP) was prepared by dissolving FR-26LC™ friction reducer in 3% KCl brine. To this gel was added 50 lb/Mgal OXOL™ II and adjusted the pH to about 6 with HCl. To this solution was added 1.5 gal/Mgal of CAT®-3 activator, available from Halliburton Energy Services, Inc., and the solution was kept at 95° F. The solution took almost 24 hours to reduce the viscosity.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   providing a polymer breaker composition that comprises a source of hydrogen peroxide and an activator, wherein the activator comprises at least one activator selected from the group consisting of: an acyl donor and a transition metal catalyst, and
   the activator is present in the polymer breaker composition in an amount from about 0.15% to about 1% by volume of the polymer breaker composition; and
   introducing the polymer breaker composition into a well bore penetrating a subterranean formation so that the polymer breaker composition interacts with a synthetic polymer to break the synthetic polymer.

2. The method of claim 1 wherein the polymer breaker composition is allowed to interact with the synthetic polymer at a static temperature of from about 60° F. to about 200° F., and the synthetic polymer is substantially broken within about 24 hours from the polymer breaker composition interacting with the synthetic polymer.

3. A method comprising:
   providing a polymer breaker composition that comprises a source of hydrogen peroxide and an activator, wherein the activator comprises at least one activator selected from the group consisting of: an acyl donor and a transition metal catalyst; and
   introducing the polymer breaker composition into a well bore penetrating a subterranean formation so that the polymer breaker composition interacts with a synthetic polymer to break the synthetic polymer, wherein the pH of the polymer breaker composition is below about 8.

4. The method of claim 3 wherein the pH of the polymer breaker composition is below about 6.

5. A method comprising:
   providing a polymer breaker composition that comprises a source of hydrogen peroxide and an activator, wherein the activator comprises at least one activator selected from the group consisting of: an acyl donor and a transition metal catalyst; and introducing the polymer breaker composition into a well bore penetrating a subterranean formation so that the polymer breaker composition interacts with a synthetic polymer to break the synthetic polymer, wherein the polymer breaker composition is allowed to interact with the synthetic polymer at a static temperature of from about 60° F. to about 200° F., and the synthetic polymer is substantially broken within about 24 hours from the polymer breaker composition interacting with the synthetic polymer.

6. The method of claim 5, wherein a viscosified treatment fluid comprises the synthetic polymer, and wherein interaction of the polymer breaker composition with the synthetic polymer reduces the viscosity of the treatment fluid to form a reduced viscosity treatment fluid.

7. The method of claim 5, wherein introducing the polymer breaker composition into the well bore comprises introducing a treatment fluid comprising the polymer breaker composition and the synthetic polymer into the well bore.

8. The method of claim 5, wherein the synthetic polymer is a component of a filter cake.

9. The method of claim 5, wherein a tool present in the well bore comprises the synthetic polymer.

10. The method of claim 5, wherein the polymer breaker composition is allowed to interact with the synthetic polymer to form a broken synthetic polymer;

the broken synthetic polymer is dissolved in water; and
the broken synthetic polymer is recovered from the subterranean formation.

11. The method of claim 5, wherein polymer breaker composition is allowed to interact with the synthetic polymer at a static temperature in the range of from about 60° F. to about 150° F.

12. The method of claim 5, wherein polymer breaker composition is allowed to interact with the synthetic polymer to achieve a predetermined viscosity.

13. The method of claim 5, wherein the polymer breaker composition further comprises a pH adjusting compound.

14. The method of claim 5, wherein the polymer breaker composition comprises a source of hydrogen peroxide and an activator comprising a transition metal catalyst.

15. The method of claim 14, wherein the transition metal catalyst comprises at least one transition metal catalyst selected from the group consisting of: manganese; copper; cobalt; and any combination thereof.

16. The method of claim 14, wherein the source of hydrogen peroxide comprises at least one source of hydrogen peroxide selected from the group consisting of: an inorganic persalt; and alkali metal peroxide; an organic peroxide; hydrogen peroxide; and any combination thereof.

17. The method of claim 14, wherein the transition metal catalyst is chelated.

18. The method of claim 14, wherein the source of hydrogen peroxide is present in the polymer breaker composition in an amount of at least about 0.6% by weight of the treatment fluid.

19. The method of claim 5, wherein the source of hydrogen peroxide comprises at least one source of hydrogen peroxide selected from the group consisting of: an inorganic persalt; an alkali metal peroxide; an organic peroxide; hydrogen peroxide; and any combination thereof.

20. The method of claim 5, wherein the acyl donor comprises at least one acyl donor selected from the group consisting of: ethyl acetoacetate, ethylacetate, tetraacetylethylenediamine, sodium nonanoyloxybenzenesulfonate, and any combination thereof.

* * * * *